(12) United States Patent
Kelly et al.

(10) Patent No.: US 8,538,072 B2
(45) Date of Patent: Sep. 17, 2013

(54) SYSTEMS AND METHODS FOR OPERATOR DETECTION

(75) Inventors: Michael Findlay Kelly, Montreal West (CA); David M. J. McMordie, Montreal (CA)

(73) Assignee: Imprivata, Inc., Lexington, MA (US)

( * ) Notice: Subject to any disclaimer, the term of this patent is extended or adjusted under 35 U.S.C. 154(b) by 978 days.

(21) Appl. No.: 12/547,100

(22) Filed: Aug. 25, 2009

(65) Prior Publication Data

US 2010/0111363 A1 May 6, 2010

Related U.S. Application Data

(60) Provisional application No. 61/092,184, filed on Aug. 27, 2008.

(51) Int. Cl.
*G06K 9/00* (2006.01)
(52) U.S. Cl.
USPC .......................................... 382/103; 382/118

(58) Field of Classification Search
USPC .................................................. 382/103, 118
See application file for complete search history.

(56) References Cited

U.S. PATENT DOCUMENTS

| | | | |
|---|---|---|---|
| 6,111,517 A * | 8/2000 | Atick et al. | 340/5.83 |
| 6,700,999 B1 * | 3/2004 | Yang | 382/118 |
| 2003/0012408 A1 * | 1/2003 | Bouguet et al. | 382/103 |
| 2005/0213793 A1 * | 9/2005 | Oya et al. | 382/103 |
| 2008/0232641 A1 * | 9/2008 | Borger et al. | 382/103 |

* cited by examiner

*Primary Examiner* — Brian Q Le
*Assistant Examiner* — Michael Vanchy, Jr.
(74) *Attorney, Agent, or Firm* — Bingham McCutchen LLP (57) ABSTRACT

Various embodiments of the invention provide for methods and systems for detecting an operator's use of a secure system. Images are acquired from image sensors that monitor a detection zone about the secure system. Faces within the images are identified and tracked among subsequently acquired images. Upon receipt of a valid login at the secure system, one of the tracked faces is selected as a primary operator and tracked as they operate the secure system.

20 Claims, 12 Drawing Sheets

SYSTEMS AND METHODS FOR OPERATOR DETECTION

CROSS-REFERENCE TO RELATED APPLICATIONS

This application claims priority to and the benefits of U.S. provisional patent application Ser. No. 61/092,184, filed Aug. 27, 2008, the entire disclosure of which is incorporated herein by reference.

FIELD OF INVENTION

The invention relates generally to systems and methods for detecting the presence or absence of objects, and more specifically to the detection and identification of operators as they interact with secure systems.

BACKGROUND

As computer systems become ubiquitous in both the home and industry, the ability for any one individual to access applications and data has increased dramatically. Although such ease of access has streamlined many tasks such as paying bills, ordering supplies, and searching for information, the risk of providing the wrong data or functionality to the wrong person can be fatal to an organization. Recent instances of data breaches at many consumer product companies and compliance with certain statutory measures (e.g., Health Insurance Portability and Accountability Act (HIPPA), Child Online Protection Act (COPA), Sarbanes-Oxley (SOX), etc.) has forced many companies to implement much stricter system access policies.

Historically, computer systems have relied on so-called "logical" authentication in which a user is presented a challenge screen and must provide one or more credentials such as a user id, a password, and a secure token. In contrast, access to physical locations (e.g., server rooms, file rooms, supply rooms, etc.) is typically secured using physical authentication such as a proximity-card or smart-card that, when presented at a card reader, grants access to the room or area. Recently, these two authentication techniques have been incorporated into single-system access authentication platforms. When used in conjunction with other more complex identification modalities such as biometrics, it has become very difficult to gain unauthorized access to secure systems.

Granting initial access is only half the story, however. Once a user has presented the necessary credentials to gain entry to a secure computer system, they may circumvent the strict authentication requirements by allowing other users to "piggy-back" on their credentials. Users departing from an authenticated session may fail to terminate the session, leaving the session vulnerable to unauthorized access. As a result, sensitive data may be exposed to access by unauthorized individuals.

Currently available commercial solutions for detecting user presence and departure suffer from significant practical limitations. For example, "timeouts" are used to terminate system access if keyboard or mouse activity is not detected over a period of time. Using these techniques, however, the detection of an operator's presence is not directly tied to sensing the operator and erroneous results may be generated in cases of extended passive interaction. Further, such systems cannot discriminate between different users and a timeout period introduces the potential for unauthorized use in secured systems.

Token objects such as passive or active tags carried by users may also be used to grant access to secure systems. Radio-frequency tokens may also be used to detect user departure based on a detected increase in distance between the token object and the base transceiver. However, these systems suffer from an inability to reliably resolve the distance between the token and receiver, which can result in a restricted or unstable detection zone. Furthermore, the devices can be readily swapped or shared, and are costly to install and manage. Other systems rely on the detection of any acoustically or optically opaque object within the detection zone. Again, such approaches suffer from various drawbacks, including having very limited detection zones and the inability to distinguish between different operators and detect the re-entry of previously authenticated users. Other suggested solutions have used body-mass detection devices such as a pressure mat, which can be easily fooled using non-human objects.

What is needed, therefore, are techniques and supporting systems that can determine when an otherwise authorized user is no longer interacting with a secure system, if another person is attempting to access the system without re-authentication, and allowing the authorized user to restore their session without needing to resubmit their credentials.

SUMMARY OF THE INVENTION

The invention generally facilitates the identification and tracking of operators of secure systems. In order to provide a complete picture of who is using a system and how, three functions are needed—operator identification, operator tracking, and re-entry detection. For example, operator identification may be achieved using one or more video cameras and object recognition techniques (image processing or other) to detect and locate a single operator and differentiating the operator from non-operators and the background scene. Data from secondary sensors can be incorporated into the analysis to enhance the discrimination of an operator from non-operators and from the background scene.

Once an operator is identified, her movements within a detection zone are tracked to determine when and if she is interacting with the secure system. In certain implementations, this is done without having to continually re-identify the operator, instead relying on following the motion of the operator. Data received from the primary sensor is interpreted using computer vision motion analysis and other techniques to detect the position and size of the operator to detect when she is in and exits the detection zone. Periodic re-identification of the operator confirms and/or corrects the tracking system's estimate of position based on data from the sensor (s). In some cases, tracking continues even in the absence of re-identification data. The reappearance of the operator after an absence from the detection zone may also be detected. For example, a stored exemplar of previously identified operators may be used to detect the operator upon reappearance and within a pre-defined time window.

In general, in one aspect, embodiments of the invention feature a computer-implemented method for detecting an operator's use of a secure system. The method includes acquiring images from image sensors that are co-located with the secure system and monitor a detection zone about the secure system. Faces within the images are identified and tracked among subsequently acquired images. Upon receipt of a valid login at the secure system, one of the tracked faces is selected as a primary operator and tracked as they operate the secure system. In some instances, the secure system is continuously notified while the operator remains in the detection zone and, in some cases, deactivates a screen-saver function.

In some embodiments, the absence of the primary operator from the detection zone is detected after tracking the primary operator of the system. The re-entry of the primary operator into the detection zone may be detected after detecting the absence of the primary operator from the detection zone. In some instances the detection may occur within a threshold time period. In certain implementations, identification of faces within the images includes generating a list of candidate faces from the faces and removing invalid faces from the list of candidate faces based on a size parameter, a completeness parameter, a matching parameter and/or a motion parameter, resulting in a filtered face list. The filtered face list is compared with a previously generated face list using a size parameter, a completeness parameter, a matching parameter and/or a motion parameter and updating the previously generated face list with face information from the filtered face list.

In some embodiments, selecting one of the tracked operators as a primary operator includes removing faces from a frame of the images that are not present in a previous frame, removing faces from the frame of one of the images having been first detected less than a specified time period prior to the frame, and selecting one of the remaining faces as the primary operator. Tracking the primary operator may include assigning tracking points to points on the selected face. The tracking points are periodically updated, and errant points are detected based on a velocity threshold. A correction factor is then applied to errant points, wherein the correction factor is based on an average change in position of neighboring points. Detecting the absence of the primary operator from the detection zone may, in some cases, determine if walk-away conditions exist. Walk-away conditions may include, for example, (i) a center point of the selected face nearing an edge of the image, (ii) a determination that the selected face will be outside a frame within the image in a subsequent frame, and/or (iii) the selected face appears smaller than a size threshold.

Detecting the re-entry of the primary operator into the detection zone may include detecting, within a re-entry threshold, left and right eye positions of a newly-appearing face in an image and computing a normalized image of the image. The normalized image is compared to stored facial images, and finding a match. In some implementations, sets of facial exemplars for multiple users may be stored and a re-appearing operator may be re-authenticated on the secure system based on the stored facial exemplars, thereby automatically restoring or activating a previously authenticated session.

In another aspect, a system for detecting an operator's use of a secure system includes a detection and identification module, an authentication modules, and a tracking module. The detection and identification module is configured to (i) acquire images from image sensors which are co-located with the secure system and monitoring a detection zone about the secure system, (ii) identify one or more faces within the images, and (iii) track the faces among subsequently acquired images. The authentication module selects one of the tracked faces as a primary operator in response to receiving a valid login at the secure system, and the tracking module tracks the primary operator as they use the secure system.

In some implementations, the detection and identification module may detect the absence and/or re-entry of the primary operator into the detection zone after an absence of the primary operator from the detection zone. Facial recognition may be accomplished, for example, by generating a list of candidate faces from the faces identified in the images and removing invalid faces from the list of candidate faces based on a parameter such as size, completeness, matching and/or motion, resulting in a filtered face list. The filtered face list is compared to a previously generated face list using the same parameters, and the previously generated face list with face information from the filtered face list.

In some cases, the detection and identification selects a tracked operator as the primary operator by removing faces from a frame of one of the images that are not present in a previous frame and removing faces from the frame of one of the images having been first detected less than a specified time period prior to the frame. One of the remaining faces is then selected as the primary operator. The tracking module may, in some cases, track the primary operator by assigning tracking points to points on the selected face, periodically updating the tracking points, and detecting errant points based on a velocity threshold. A correction factor (based, for example, on an average change in position of neighboring points) may then be applied to the errant points.

In some embodiments, the tracking module detects the absence of the primary operator from the detection zone by determining if one or more walk-away conditions exist. Examples of walk-away conditions include: a center point of the selected face nearing an edge of the image, a determination that the selected face will be outside a frame within the image in a subsequent frame, and the selected face appears smaller than a size threshold. Further, the tracking module may also detect the re-entry of the primary operator into the detection zone. Re-entry of the operator may be detected by recognizing that, within a re-entry time threshold, left and right eye positions of a newly-appearing face appear in an image, computing a normalized image of the image, and comparing the normalized image to stored facial images.

In some implementations in which multiple clients, workstations or instantiations of a secure system utilize the techniques described above, a communications channel may be initiated between the multiple instances of the detection and identification module, the authentication module and/or the tracking module, thus allowing transmission of operator presence, location and biometric information between the instances to provide a single, aggregate measure of operator presence or absence.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DESCRIPTION OF THE INVENTION

In various embodiments, the invention facilitates the detection, unique identification and tracking of users as they interact with a secure system. In general, the technique optically monitors a spatial region about the system (i.e., a "detection zone") for certain events that trigger processes such as automated logout and automated re-authentication to the system. The detection zone may be directly adjacent to some part of the secure system, or some radial distance around it. For example, when an operator interacts with a computer-based system having a monitor, the detection zone is typically a pyramidal volume extending radially outward from the monitor (described in greater detail below with reference to FIG. 11). Examples of events that may trigger these processes include detecting a new person in the detection zone, no longer sensing the authenticated operator in the detection zone (either immediately or for some pre-determined amount of time), and the re-entry of an authenticated operator into the detection zone (typically within a predetermined threshold of time).

An operator interacts with a system in a passive or active manner. Active interaction occurs when the operator is in the detection zone and directly conveys information to the secure system. For example, in the case of a computer system, the operator may press keys on a keyboard, move a mouse, or speak into a microphone. For passive interaction the operator is in the detection zone, but has no direct interaction with the system. For example, in a computer setting, an operator may passively read material on a monitor or listen to audio being streamed to the system without interacting with any input devices.

Operator interactions with the secure system are typically tracked on a session-by-session basis, where a session may be defined as the segment of time when the operator interacts actively or passively with the secure system. A session may begin before authentication, but sometime shortly after the operator enters the detection zone, and may end any time up until the operator exits the detection zone.

In some embodiments, the invention may include one or more video cameras (or other optical or thermal sensors) acting as a primary sensor for monitoring the detection zone and a processor for interpreting images received from the cameras. An operator is automatically located and tracked using one or more image processing algorithms that are implemented on the processor (described in greater detail below with reference to FIG. 12), typically as a series of computer-executable software instructions.

The camera (and additional optical components) may determine the size of the detection zone. In some implementations, multiple sensors may be employed, some being visuals sensors and some being audio, heat or other types of sensors. Algorithms implemented on the processor may receive and process data from the sensors in order to track the operator and better discriminate the operator from inanimate objects and other non-operators. Determinations as to the authenticity of the operator may be provided to the secure system to facilitate the granting or denial of access to the system itself or, in some cases applications and/or data residing stored on the system.

In some implementations, multiple symmetric sensor and algorithm combinations facilitate operator detection across multiple secure systems in separate locations. In these configurations, a communications channel operating among the multiple systems allows one detection system to communicate the presence and departure of the operator, biometric information and information about the operator's location within the detection zone to other nearby detection systems in order to facilitate seamless tracking of an operator from one environment to the next.

Similarly, an operator may interact simultaneously with multiple secure systems located within a common location. In this instance, the notion of a session applies to the operators presence within the detection zone of any one of the secure systems and interaction with any one of these systems. Concurrent instances of the operator detection algorithms may communicate with each other in order to achieve the aggregate effect of tracking the operator's presence within a larger combined detection zone.

In some embodiments of the invention, a secure-system's screen saver may be suppressed when the operator is located within the detection zone but is interacting passively with the secure-system.

In some cases, the presence of persons other than the previously authenticated operator of the secure system within the detection zone represents an actionable event that causes the system to terminate access or request authentication of both individuals. For example, if the operator is present and another individual is detected (e.g., someone behind the user that is trying to see the contents of the screen), the system can warn the operator that there is another individual present and/or lock the session entirely. In other instances, the system may detect the presence of an individual other than the authenticated user after the authenticated user has left the detection zone but before the activation of a screen lock. In such cases, the system immediately locks the system and awaits the return of the authorized operator or a new valid authentication event.

Figure 1:
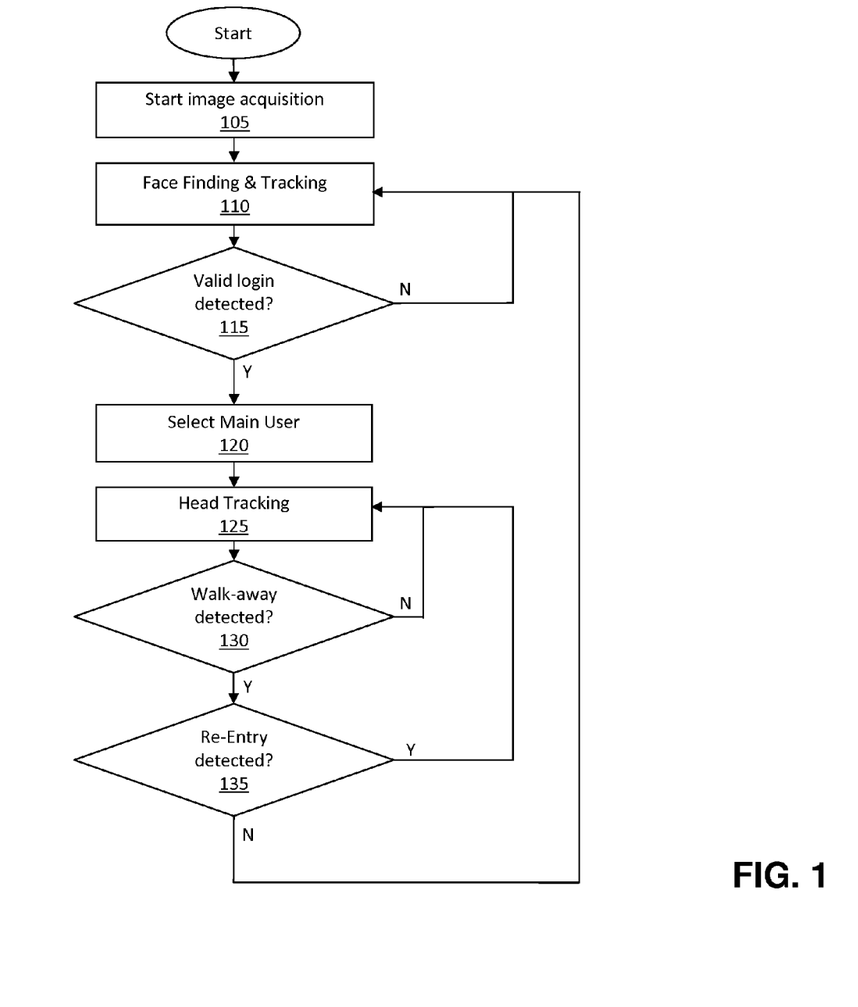
FIG. 1 is a flow chart depicting a process for the detection and identification of operators as they interact with secure systems in accordance with various embodiments of the invention.
Figure 2:
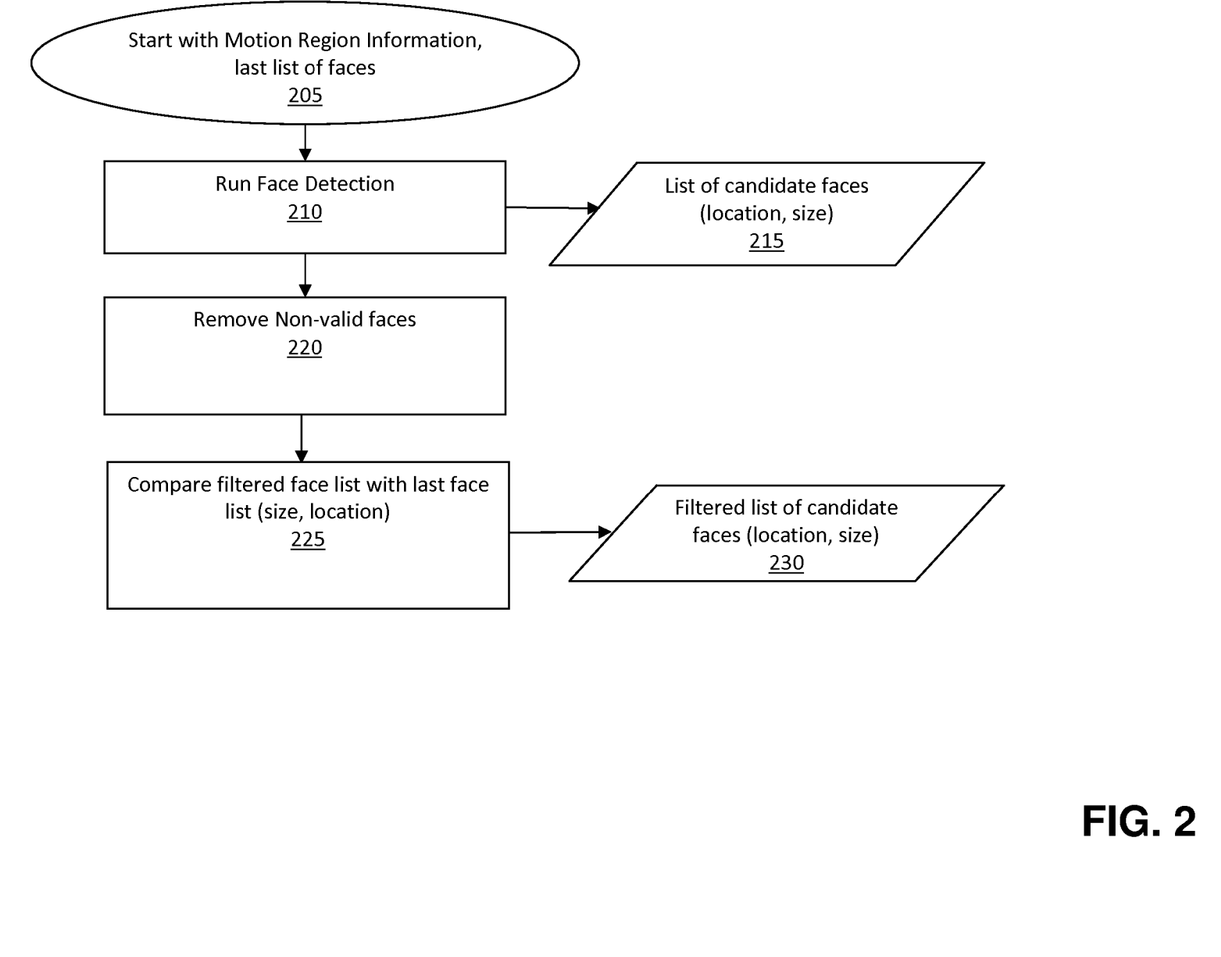
FIG. 2 is a flow chart depicting a process for the detection and tracking of faces as identified in the images received from the sensor(s) in accordance with various embodiments of the invention.

Referring to FIG. 1, a method for detecting the presence of an operator at a secure system includes the stems of initiation of image acquisition from a sensor such as a camera connected to the secure-system (105); face finding and face tracking within the detection zone (110); detection of a valid login from the authentication application operating on the secure system (115); selection of a main operator as the user of the secure system (120); tracking of the operator's head within the detection zone (125); detecting the departure of operator from the detection zone, also referred to as a walk-away event (130); and detection of the operator's re-entry within the detection zone (135). Secondary processes may operate in parallel to the above mentioned primary processes such as inferred walk-away detection (described in greater detail below with reference to FIG. 7). As depicted in FIG. 2, the face-finding and tracking process detects and tracks faces located within the detection zone about the secure system, as identified in the images received from the sensor(s). The process starts by loading any previously-stored motion information within the detection zone as well as a list of faces previously detected in the motion zone (if such data is available) (205). If the process is being run for the first time at a particular system or terminal, the motion information and previous face list may not be present in the volatile main memory. In such cases, this step may be skipped, or, in some cases the information may be retrieved from another system. One or more face detection algorithms are then used to determine an identity associated with the images. Examines of such algorithms include, boosted cascades of Haar-like templates, facial landmark identification, statistical modeling, color analysis, Scale Invariant Feature Transform (SIFT) or similar techniques (210). As a result, a list of candidate face locations and sizes are created for the incoming video frames (215). Since certain face detection techniques may produce both false positives (indicating an image is associated with a known identity when it is in fact not) and/or false negatives (not associating an identity with an image when one should have been recognized), the list may be incomplete and contain spurious entries. To compensate for these limitations, candidate faces may be further filtered based on a number of criteria, such as faces that are smaller or larger than a predetermined threshold, are located partially outside of the detection zone, are located in a region where no motion was detected, are overlapping with a larger face, or are moving too fast (220). The remaining list of faces is then compared to a previously stored list of faces. The location and size of the faces that appear in both lists are updated; faces that do not appear in lists after a predetermined period of time are removed (225). The resulting filtered list of candidate faces (230) thus contains entries which have been seen regularly for some defined period of time, do not overlap completely with other candidate faces, and which move in a manner consistent with human movement (e.g., move at a limited maximum speed). For each entry, the size and location in the image are stored in volatile main memory along with a first observed and most recently observed timestamp. This process may operate in a continuous loop until a valid login is detected from the authentication application, at which point the primary operator detection process is initiated (described in greater detail below with reference to FIG. 3).

Figure 3:
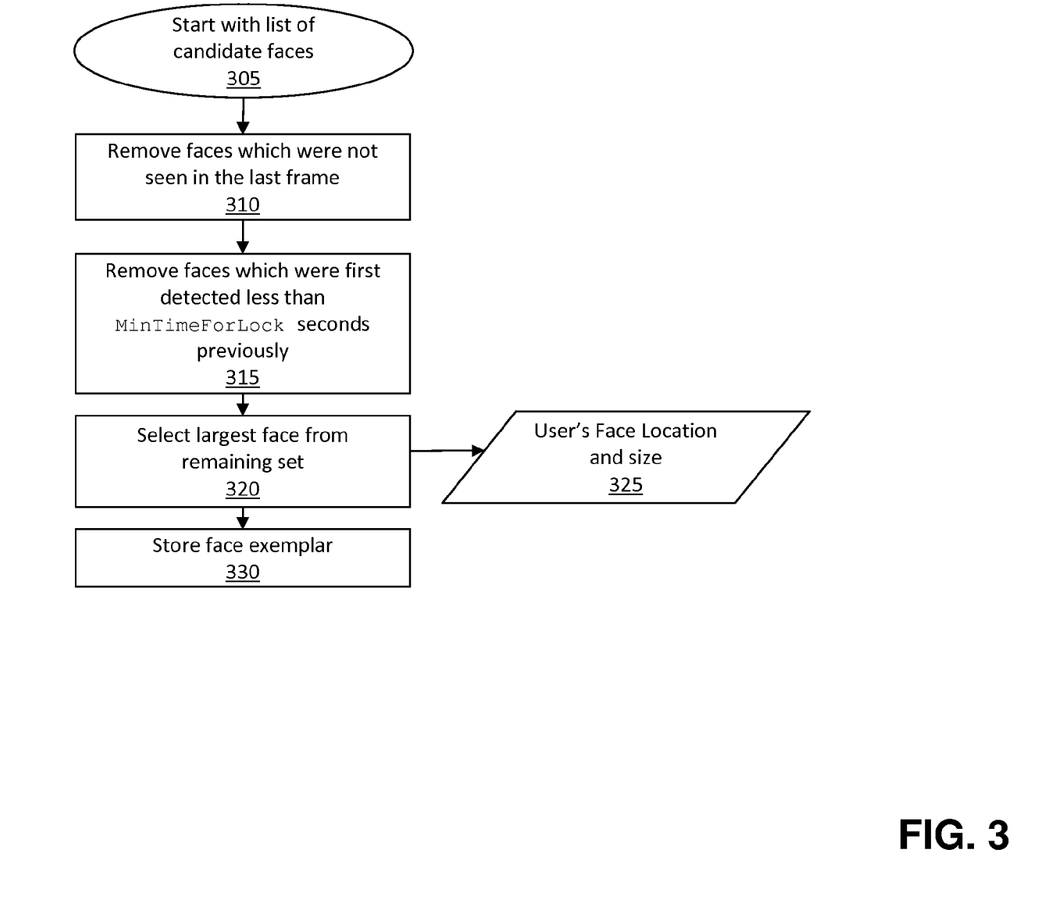
FIG. 3 is a flow chart depicting a process for detecting a primary operator and identifying the primary operator in accordance with various embodiments of the invention.

FIG. 3 illustrates an exemplary process for detecting a primary operator and identifying the primary operator as the authenticated user of the system. Upon receiving an indication from the authentication application that a valid user has been granted access to the secure system, the most recent list of candidate faces generated by the face-finding and tracking process (305) is retrieved from memory. This list may contain more than one face, and as such the process serves to identify the authenticated operator from among the faces. Filtering techniques include removing candidate faces that were not seen in the last detection cycle (310) and/or removing candidate faces that were only detected for a short period of time (320). The filtering techniques may also remove identities associated with any erratic or quickly moving individuals. From the resulting list, the largest candidate face is chosen to represent the operator (330). The operator's face location and size is the stored in volatile main memory (325), and the store face exemplar process is initiated (described in greater detail below with reference to FIG. 9).

Once the operator has been selected and associated with a candidate face, the position and size of her face is identifiable in the sensor's image stream. The system then tracks movements of her head and determines if and when she has left the camera's field of view. One approach to detecting the presence of an operator might rely solely on face detection, blob tracking, optic flow or other conventional computer vision techniques. However, these approaches may produce less than desirable results when the operator is not squarely facing the screen, or she remains very still while continuously interacting with the secure system for a long period of time. Therefore, a combination of multiple approaches is used to increase the reliability of operator tracking during times of typical operator movement and behavior.

Figure 4:
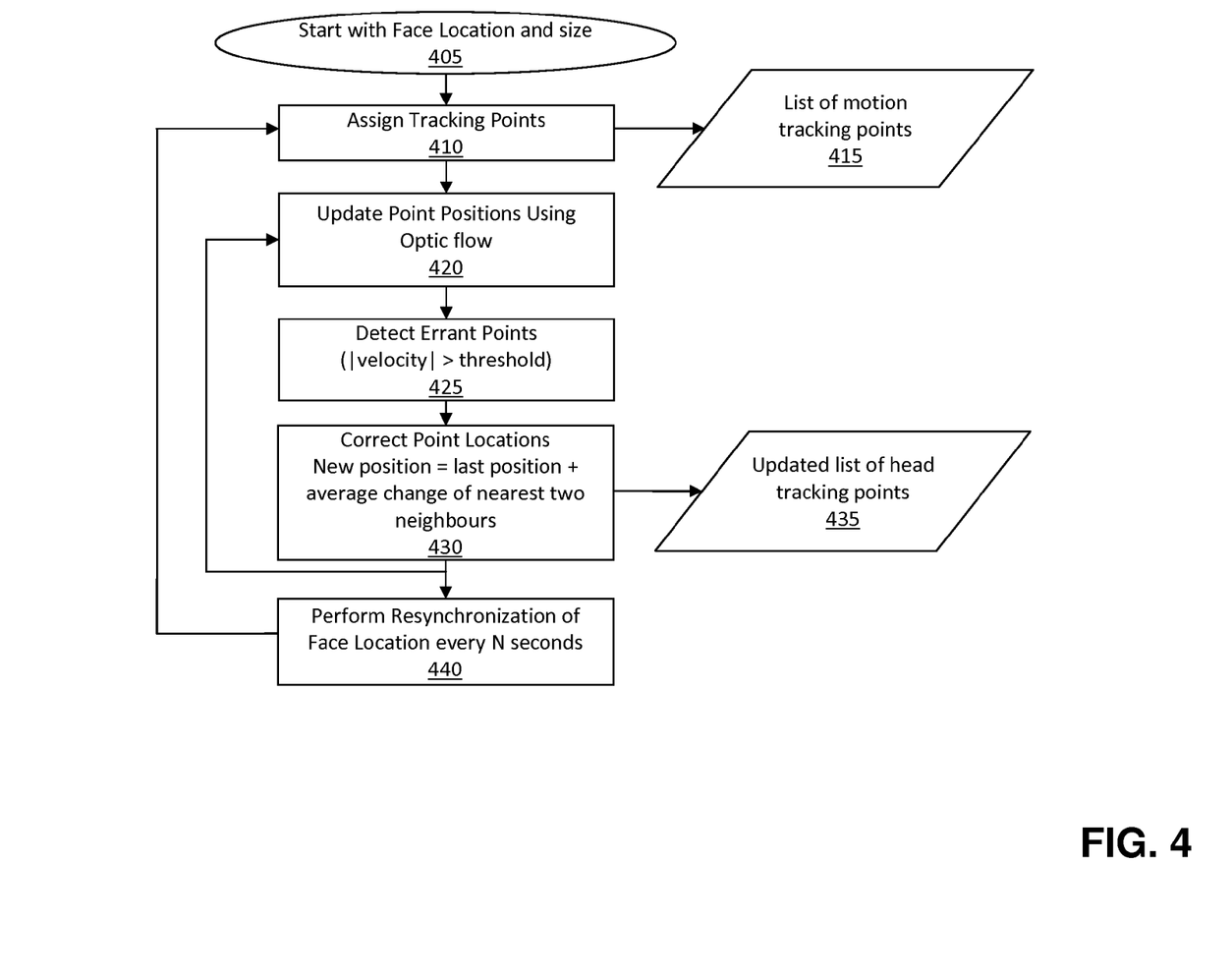
FIG. 4 is a flow chart depicting a process for head tracking in accordance with various embodiments of the invention.

As illustrated in FIG. 4, the head-tracking process combines the outputs of multiple tracking techniques in a manner tailored to the needs of operator tracking. Since conventional face detection techniques depend on seeing frontal views of an operator's face and are unable to detect heads which are turned away from the host system, they are unsuitable for head tracking and can only be employed to produce an estimate of the initial location of the operator's head during authentication, when the operator is most likely facing the host system. Therefore, to track the operator after authentication, an optic-flow point tracking methodology is employed.

Conventional optic-flow algorithms, which track the movement of key points through a successive stream of video frames, suffer from drift over time, as well as erratic behavior in response to changes in lighting. Despite this, the motion of a cluster of many optic flow points assigned to a moving object generally demonstrates overall movement consistent with the movement of the subject. Thus, to compensate for drift and erratic point behavior, an initial face location and size (405) is augmented with a grid of points in the image (410). The nearest neighbors in this grid are labeled and recorded for later use (415) in volatile main memory. After each optic-flow tracking update, the new positions are compared to the positions on the last iteration, and a velocity is computed (420). If the velocity of a point differs greatly from that of the nearest neighbor points (e.g., above a predetermined threshold measured in pixels, for example), the point is deemed errant (425), and a new location is assigned as the sum of the point's old location and the average of the motion vectors of its two nearest neighbors (430). The list of head tracking points is then updated (435) in volatile main memory. This approach results in a highly stable tracking of the operator's movement in the image and provides reliable estimates of the position of the operator's head even when she is not facing the camera.

Figure 5:
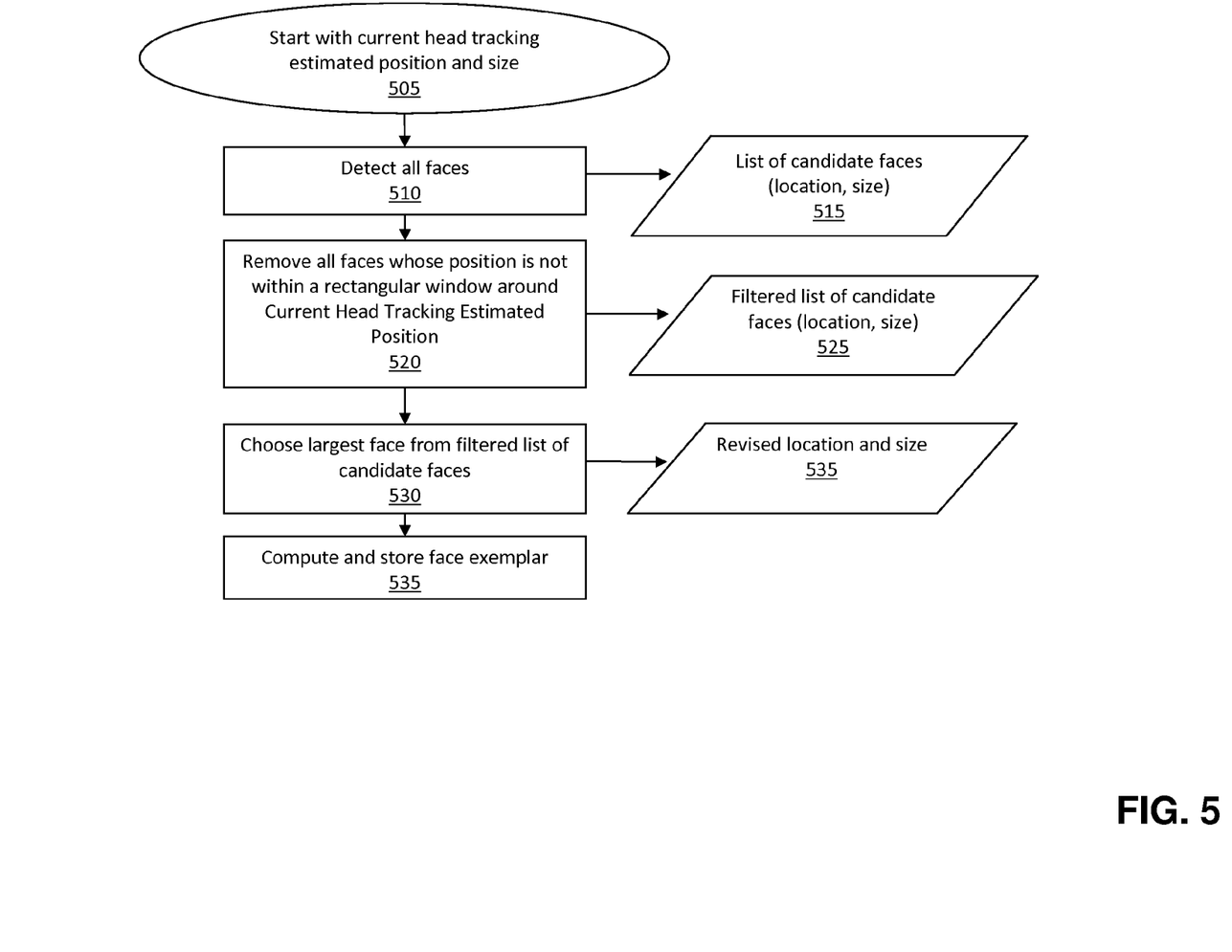
FIG. 5 is a flow chart depicting a process for the resynchronization of face location in accordance with various embodiments of the invention.

To further extend the stability and reliability of the head tracking process, the head tracking position estimate is periodically corrected by re-detecting the operator's face in a rectangular window around the current head estimated location, as described above. This re-synchronization corrects any residual drift in the optic-flow point grid by re-assigning the grid and restarting tracking based on a new face detection estimate. The process starts by retrieving current head tracking estimated position and size (505) from volatile main memory. All faces in the detection zone are then detected (510) using the same techniques as described instep (210) above. A list of candidate faces, along with their locations and sizes are stored in volatile main memory (515). Next, all faces whose position is not within a rectangular window around the current head tracking estimated position are removed (520). The list of filtered candidate faces is then updated in volatile main memory (525). The largest face present in the list (530)

is selected as the new face location and size, and is updated (535) in volatile main memory. The final step in the process is to initiate the store face exemplar process (described in greater detail below with reference to FIG. 9).

The combined approach of face-finding to set initial conditions, optic-flow tracking filtered with motion-based constraints, and periodic resynchronization results in greater stability over periods extending to many tens of hours or days—well in excess of the typical duration of an operator's session on the secured-system.

The head tracking process may run in a continuous loop until the operator is detected leaving the detection zone. The process for detecting the exit of an operator from the detection zone (referred to below as the "walk-away condition") may run concurrently to the head-tracking process, and is described in greater detail.

Figure 6:
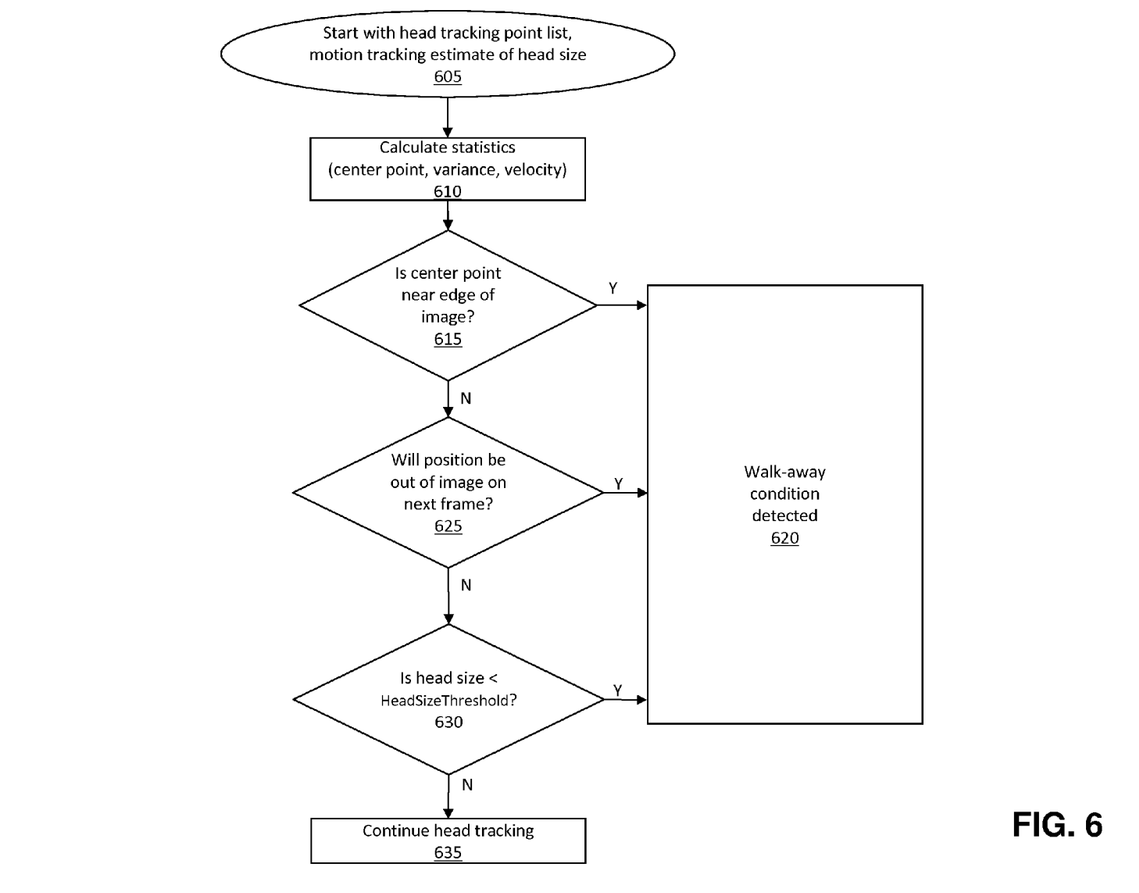
FIG. 6 is a flow chart depicting a process for the detection of the departure by the operator from the secure system (referred to as walk-away detection) in accordance with various embodiments of the invention.

The walk-away condition detection process determines when the operator has left the detection zone around the secure-system, enabling the authenticated session to be automatically closed in a timely manner. As illustrated in FIG. 6, the process starts by retrieving the head tracking point list and the estimate of head size from volatile main memory (605). Certain statistics pertaining to the operator's head movements, in particular the head's center point, velocity and variance are then calculated (610). The next step is to detect if the operator's head center point is located near the edge of the image (615). If it is, then the process signals a walk-way condition event (620). This captures the walk-away events where the operator's head is detected to have moved outside a rectangular boundary in the image provided by the sensor (s).

If the center point is not located near the edge of the image, then the next step in the process is to determine, based on the head's position, movement direction and velocity, if within the next frame the operator's head position is likely to be out of the image (625). Should this be the case, the process detects a walk-way condition event (620). This captures the walk-away event where the operator's head moves very quickly in such a way that it moves from well inside the rectangular boundary in the image to the view of the sensor(s) in a single iteration.

If the operator's head is not detected to be moving rapidly, a determination is made as to whether the image of the operator's head size has become smaller than a predetermined minimum head-size threshold (630). Should this be the case, a walk-way condition event is initiated (620). This captures the walk-away event in which the operator has left the detection zone by moving directly away from the sensor such that the tracking system is recording the position and size of the operator's head, and the size of her head gets progressively smaller while remaining in the same (or nearly the same) position.

If none of the walk-away event triggers are detected, head tracking process described above continues in a loop until the walk-away detection process (FIG. 6) triggers a walk-away condition event (620). If there is no indication that an operator has left the detection zone, an inferred walk-away detection process may automatically terminate the authenticated session following a period of inactivity.

Figure 7:
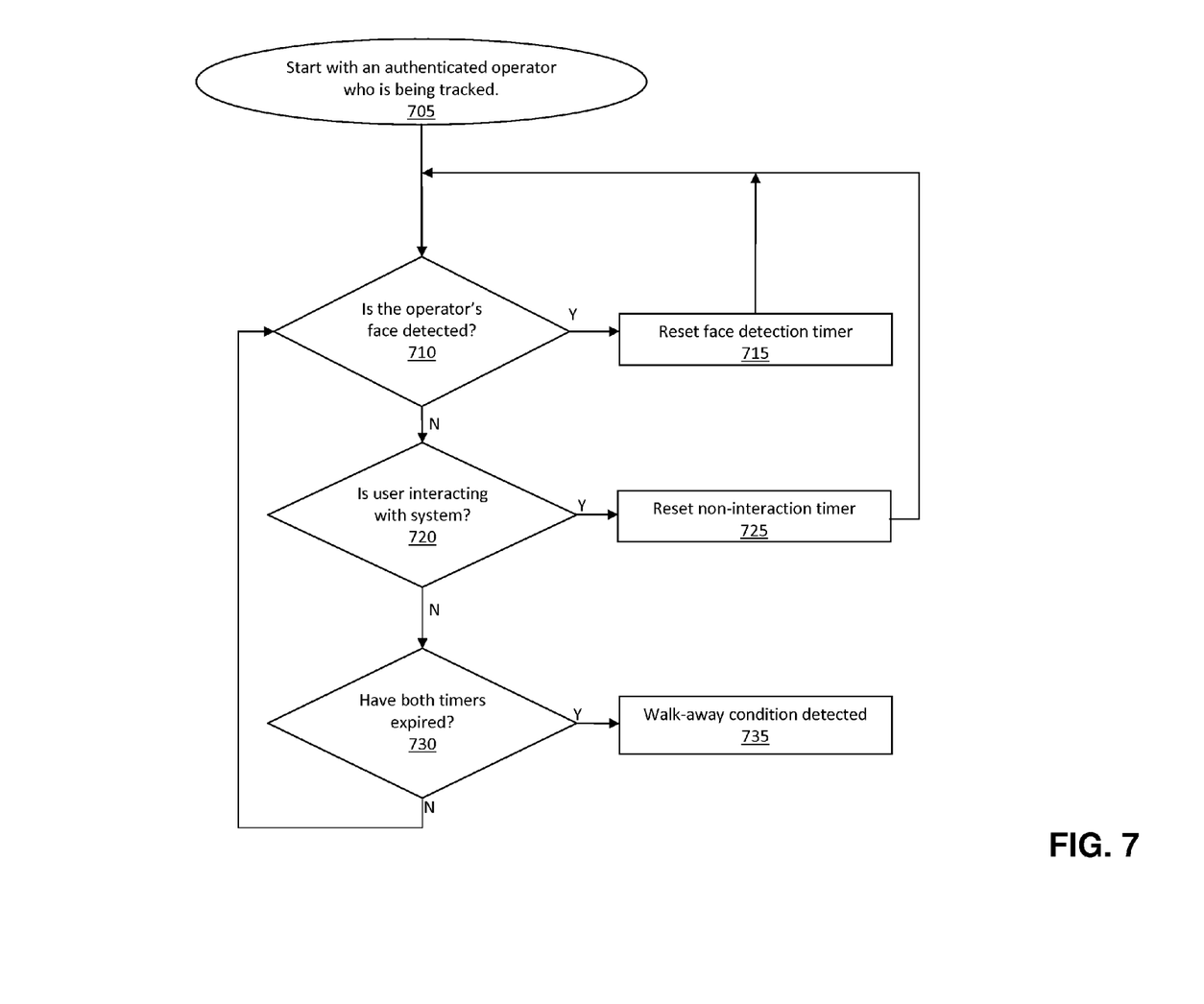
FIG. 7 is a flow chart depicting a process for inferring a walk-away event in accordance with various embodiments of the invention.

FIG. 7 illustrates the inferred walk-away detection process. The process begins by retrieving the information on the operator's face (705) as stored in volatile main memory by the head tracking process and determining if the operator's face is detected (710). Although the operator's head is determined to be present in the detection zone by the head tracking process, the operator may be facing away from the sensor, in which case the operator's face would not be detected. This event may also occur if the head tracking process has erroneously started tracking an object other than the operator's head. If however, the operator's face is detected, then a face-detection timer is reset (715), and the face detection step is repeated in a loop until the operator's face is no longer detected for a predetermined period of time.

Simultaneously, a determination is made as to whether the user is actively interacting with the system, for example by moving the mouse of typing on the keyboard (720). If this is the case, then a non-interaction timer is reset (725). If no indication of active interaction has been detected for a predetermined period of time and the user's face has been detected for a predetermined period of time (730), then a walk-away condition event is detected (735) and the operator's session is automatically closed.

Figure 8:
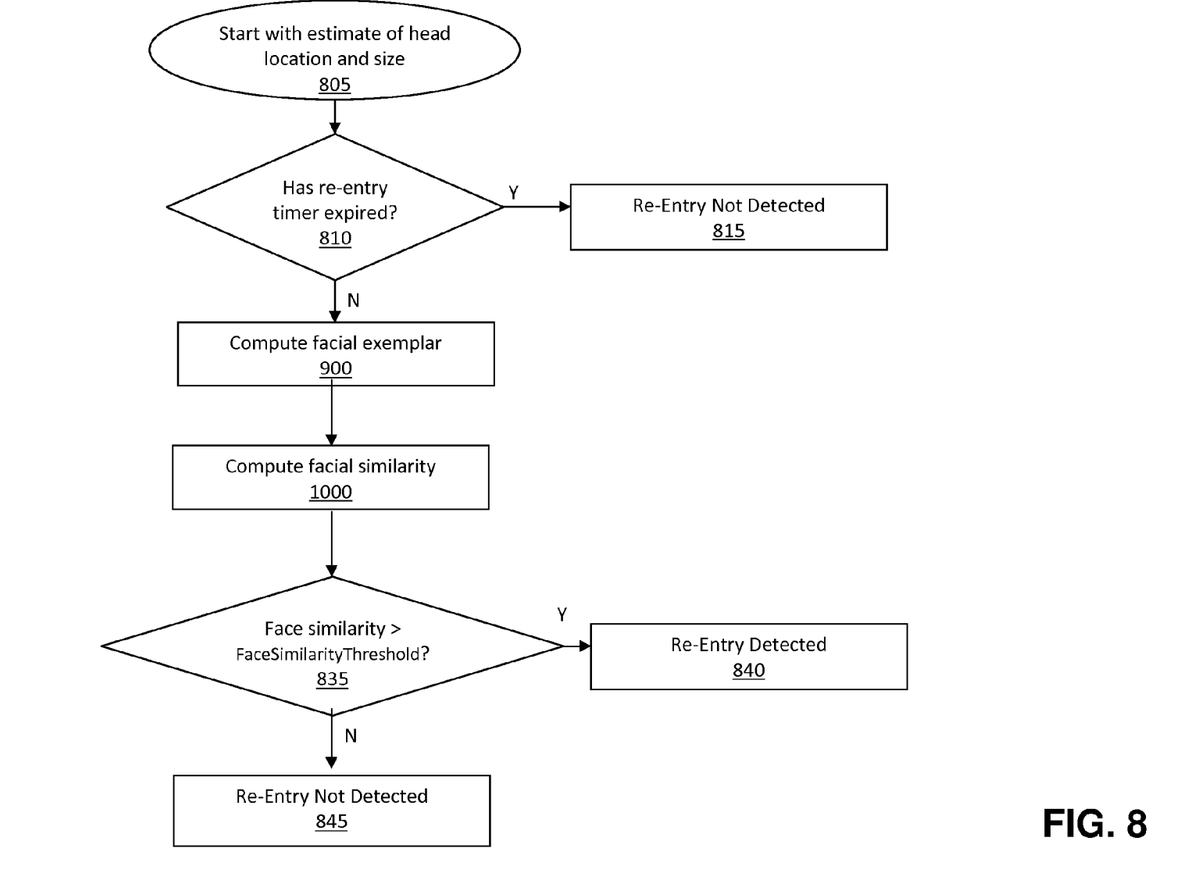
FIG. 8 is a flow chart depicting a process for the re-entry detection of the operator within the detection zone in accordance with various embodiments of the invention.

In some instances, the operator may exit the detection zone while interacting with the secure system and return at a later time. A process for detecting operator re-entry is illustrated in FIG. 8. Such a process ensures that the operator's session continues or is re-initiated without requiring the operator to re-authenticate through the authentication application.

The re-entry detection process detects a face in the images provided by the sensor during a predetermined time period following the last walk-away event (805). If the re-entry timer expires (810), then re-entry is not detected (815). For each face identified, associated eye regions are then located (820). These locations are then used to crop a facial sub-image from the source image to normalize the image by rotating the sub-image into a standard form so that the line joining the two eyes is horizontal and that the height and width of image are of a fixed size (825). Each normalized face sub-image is then compared against a set of stored facial exemplars captured during the previous session or sessions, as described in greater detail below. This similarity comparison generates a face similarity estimate, which is stored in volatile main memory (830). If the current normalized image is similar to any of the stored operator face templates (835), the system infers that the same operator has returned (840). If the face is not similar to the stored operator face templates, then the process determines that the person in the detection zone is not the previously authenticated operator (845).

By storing a set of facial exemplars for each of a number of different users who have recently been authenticated on the secure system, the present invention provides the capability to re-authenticate multiple users, in each case signaling to the secure system to activate or restore their sessions.

Figure 9:
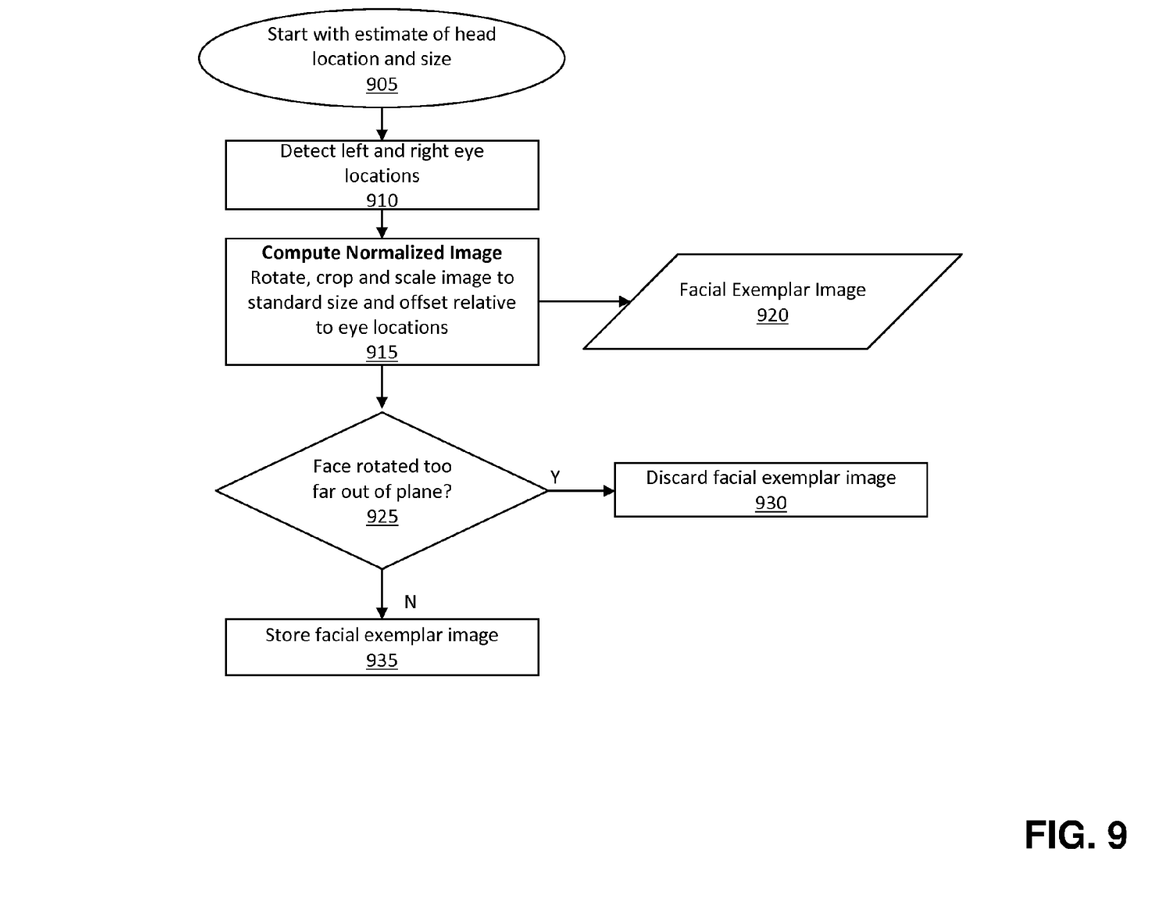
FIG. 9 is a flow chart depicting a process for computing and storing a face exemplar in accordance with various embodiments of the invention.

Facial exemplars are stored periodically during operator tracking in order to enable the re-entry detection process. The facial exemplar process, as illustrated in FIG. 9, retrieves the operator's head location and size information (905) stored in volatile main memory. The left and right eye locations are detected (910) and then the image is rotated, cropped and scaled to a standard size and offset relative to eye locations (915), which generates a normalized image (920). In some cases, the operator's face may have a rotation relative to the sensor that does not permit the generation of a face exemplar image. In such cases, the face rotation is verified (925), and if it is too far out of the horizontal plane, the face exemplar image is discarded (930). If the face rotation is within an acceptable range, one or more exemplars may be extracted using computer vision methods such as Principal Component Analysis (PCA), kernel methods, statistical methods, Scale Invariant Feature Transform (SIFT), stored templates, feature extraction, etc. (935).

Figure 10:
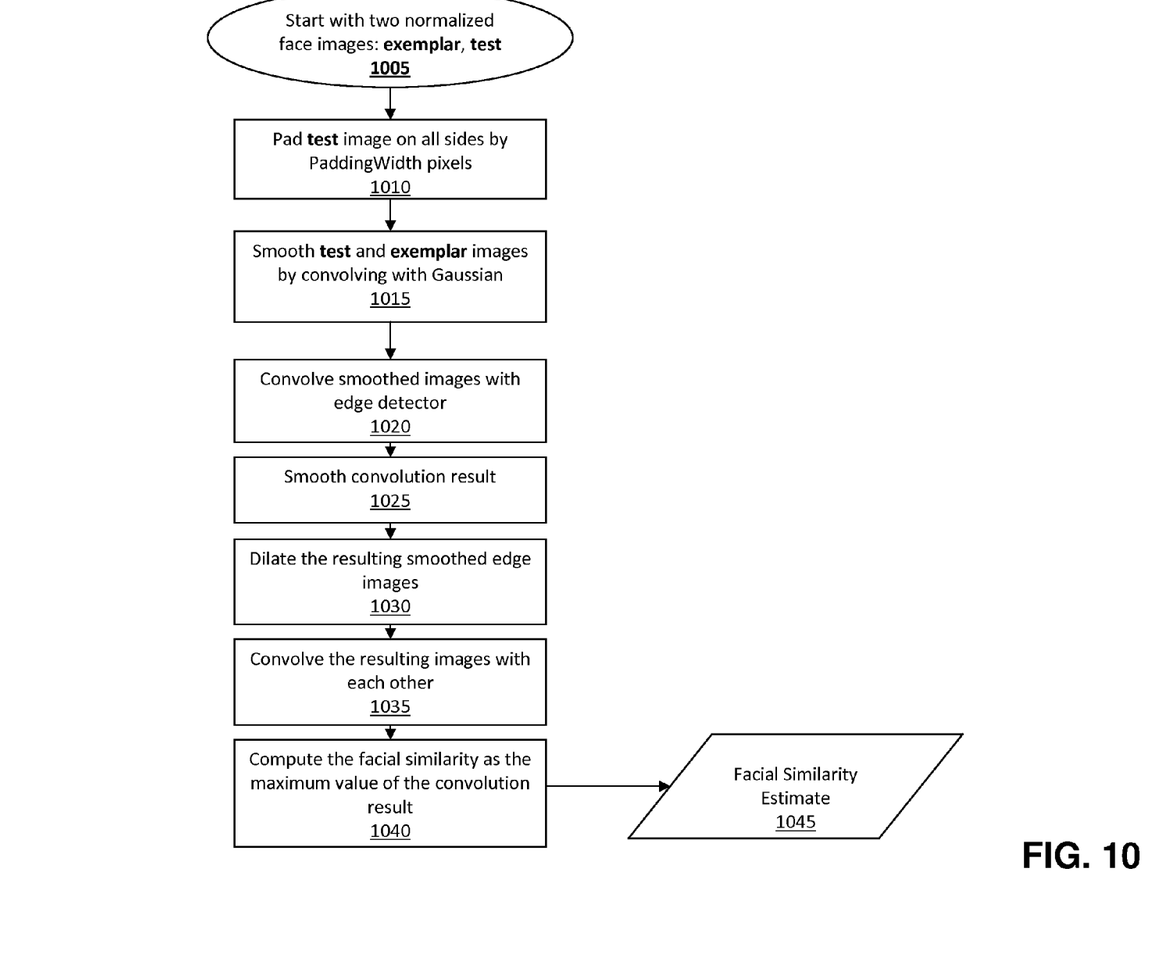
FIG. 10 is a flow chart depicting a process for the face similarity computation in accordance with an embodiment of the invention.

A stability measurement is determined during the re-entry process when a face is detected in the detection zone in order to ascertain if it matched with an authenticated user in order to continue or reinstate a session. A quantitative measure is extracted by comparing the facial exemplar from a current image to one of the stored exemplars. The means for generating this measure depends upon the type of exemplar being employed (for example such as Principal Component Analysis (PCA), kernel methods, statistical methods, Scale Invariant Feature Transform (SIFT), stored templates, feature extraction, etc). FIG. 10 describes one embodiment of the measurement of similarity process. The process starts by retrieving a single or a series of face exemplars stored in volatile main memory as well as a normalized face image generated by the re-entry process (1005). Then follows a series of steps intended to enable the face comparison between the two faces. First, extra pixels are added to the normalized face image (1010). The exemplar and normalized images are smoothed by convolving with Gaussian filter (1015), and then with an edge detector (1020). The images are then re-smoothed (1030), and the resulting images are the convolved with each other (1035). The similarity measurement are then performed based on a statistical similarity metric, such as correlation, sum-of-absolute-difference, Euclidian distance, Mahalanobis distance, etc. (1040). The measured similarity is compared to a fixed threshold in order to determine whether the re-entering face image belongs to the same individual as the facial exemplar (1045).

Figure 11:
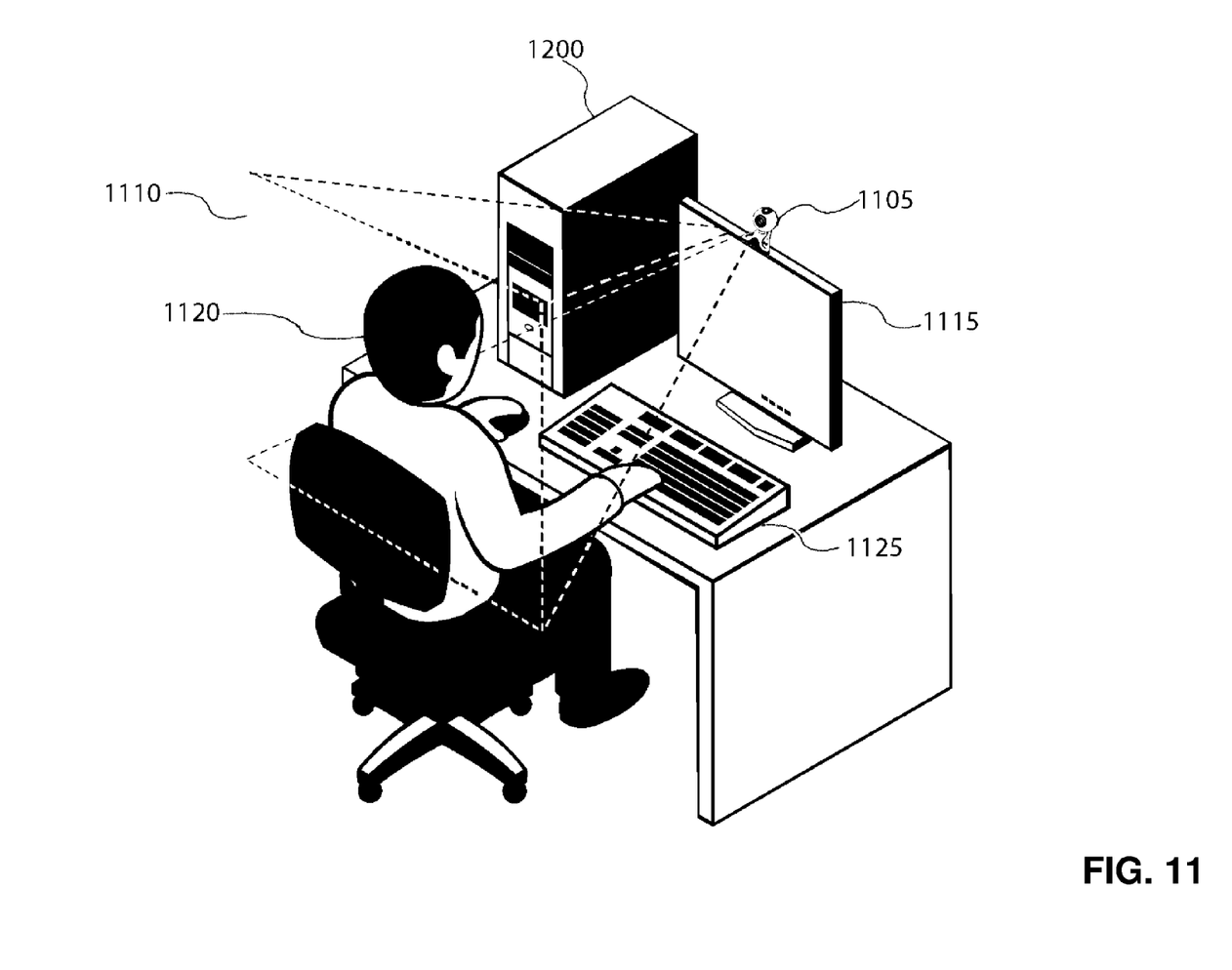
FIG. 11 is a schematic depiction of the operator detection zone for a computer-based secure system in accordance with an embodiment of the invention.

Referring to FIG. 11, a system for implementing the methods described above operates on a computer to which a camera (1105) sends images of the detection zone (1110). The images may be sent periodically or in a continuous fashion to the computer, where the various processes of this invention perform the operator presence detection, tracking and identification. The camera is typically mounted on top of a computer monitor (1115), such as an LCD, CRT or other screen, which is facing the operator (1120). Active interaction by the operator with the secure systems is depicted by the operator pressing keys on a keyboard (1125).

Figure 12:
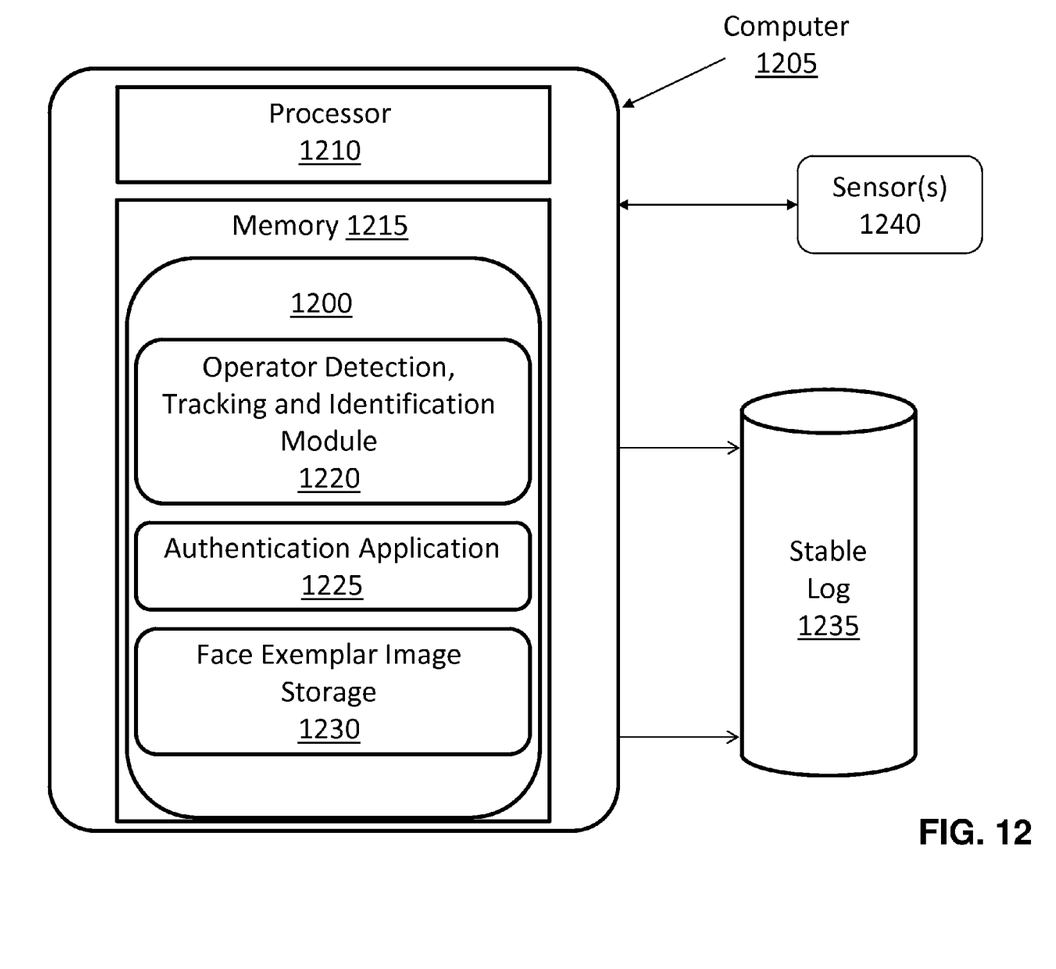
FIG. 12 is a schematic depiction of a system for performing the functions described in FIGS. 1-11 in accordance with various embodiments of the invention.

Referring to FIG. 12, the user detection system (1200) resides on a computer (1205), which contains a processor (1210) on which commands and computational requests are processed. Memory (1215), (either RAM, flash, ROM, or other storage means) stores the computer-executable instructions for implementing the operator detection, tracking and identification module (1220), which implements the various processes described in FIGS. 1 through 9. The operator detection, tracking and identification module (1220) sends computation requests to the processor for execution, and stores the results of these requests back in memory. The operator detection, tracking and identification module (1220) also communicates with the authentication application (1225), which may be part of the computer's operating system or dedicated authentication software. This communication enables the detection of an authentication event, and also closes sessions when the operator leaves the detection zone. Face exemplar images (1230), which are generated by the process described in FIG. 9, may first stored in volatile main memory, however in some embodiments of the invention, a stable log (1235) stores the results of the algorithms as well as the face exemplars, on permanent storage media such as hard drives, network drives, CDs, DVDs, tape backup or any other storage medium that does not depend on the continuous operation of the computer to maintain a readable copy of data stored on it.

What is claimed is:

1. A computer-implemented method for detecting an operator's use of a secure system, the method comprising:

acquiring one or more images from one or more image sensors, the image sensors being co-located with the secure system and monitoring a detection zone about the secure system;

identifying one or more faces within the images;

tracking the faces among subsequently acquired images; and upon receipt of a valid login at the secure system, (i) selecting one of the tracked faces as a primary operator, (ii) tracking the head of the primary operator independent of the primary operator's face in images obtained by the one or more image sensors during operation of the secure system, and (iii) determining movements of the primary operator based on at least one of a location or a size of the tracked head regardless of whether the operator is facing the one or more image sensors, wherein tracking the head of the primary operator independent of the primary operator's face comprises:

assigning tracking points to points on tracked head images;

periodically updating and re-assigning the tracking points;

detecting errant points based on a velocity threshold; and applying a correction factor to the errant points, wherein the correction factor is based at least in part on an average change in position of neighboring points.

2. The method of claim 1 further comprising detecting the absence of the primary operator from the detection zone after tracking the head of the primary operator operating the system.

3. The method of claim 2 further comprising detecting the re-entry of the primary operator into the detection zone after detecting the absence of the primary operator from the detection zone.

4. The method of claim 3 wherein the detection of a re-entry occurs within a threshold time period.

5. The method of claim 4 wherein sets of facial exemplars for multiple operators are stored and a re-appearing operator may be re-authenticated on the secure system, thereby restoring or activating their session automatically.

6. The method of claim 2 wherein detecting the absence of the primary operator from the detection zone comprises determining if one or more walk-away conditions exist, the walk-away conditions comprising one or more of (i) a center point of a tracked head image nearing an edge of the image, (ii) a determination that the tracked head image will be outside a frame within the image in a subsequent frame, and (iii) the tracked head image appears smaller than a size threshold.

7. The method of claim 2 wherein the secure system is continuously notified while the operator remains in the detection zone.

8. The method of claim 7 wherein the notification causes the activation of a screen saver.

9. The method of claim 3 wherein detecting the re-entry of the primary operator into the detection zone comprises:

within a re-entry time threshold, detecting left and right eye positions of a newly-appearing face in an image;

computing a normalized image of the image;

comparing the normalized image to one or more stored facial images, and, upon finding a match, detecting the re-entry of the primary operator into the detection zone.

10. The method of claim 3 wherein information about the operator's presence within the detection zone is stored and reported to allow automatic time and attendance reporting.

11. The method of claim 1 wherein identifying one or more faces within the images comprises:

generating a list of candidate faces from the one or more faces;

removing invalid faces from the list of candidate faces based on one or more of a size parameter, a completeness parameter, a matching parameter and a motion parameter, thereby creating a filtered face list;

comparing the filtered face list with a previously generated face list using one or more of a size parameter, a completeness parameter, a matching parameter and a motion parameter; and updating the previously generated face list with face information from the filtered face list.

12. The method of claim 1 wherein selecting one of the tracked operators as a primary operator comprises:

removing faces from a frame of one of the one or more images that are not present in a previous frame;

removing faces from the frame of one of the one or more images having been first detected less than a specified time period prior to the frame; and selecting one of the remaining faces as the primary operator.

13. A system for detecting an operator's use of a secure system, the system comprising:

a detection and identification module configured to (i) acquire one or more images from one or more image sensors, the image sensors being co-located with the secure system and monitoring a detection zone about the secure system, (ii) identify one or more faces within the images, and (iii) track the faces among subsequently acquired images;

an authentication module configured to select one of the tracked faces as a primary operator in response to receiving a valid login at the secure system; and a tracking module configured to (i) track the head of the primary operator independent of the primary operator's face in images obtained by the one or more image sensors during operation of the secure system and regardless of whether the operator is facing the one or more image sensors, and (ii) determine movements of the primary operator based on at least one of a location or a size of the tracked head, wherein tracking the head of the primary operator independent of the primary operator's face comprises:

assigning tracking points to points on tracked head images;

periodically updating and re-assigning the tracking points;

detecting errant points based on a velocity threshold; and applying a correction factor to the errant points, wherein the correction factor is based at least in part on an average change in position of neighboring points.

14. The system of claim 13 wherein the detection and identification module is further configured to detect re-entry of the primary operator into the detection zone after an absence of the primary operator from the detection zone.

15. The system of claim 13 wherein the tracking module is further configured to detect the absence of the primary operator from the detection zone after tracking the head of the primary operator operating the secure system.

16. The system of claim 15 wherein the tracking module is further configured to detect the absence of the primary operator from the detection zone by determining if one or more walk-away conditions exist, the walk-away conditions comprising one or more of (i) a center point of a tracked head image nearing an edge of the image, (ii) a determination that the tracked head image will be outside a frame within the image in a subsequent frame, and (iii) the tracked head image appears smaller than a size threshold.

17. The system of claim 15 wherein the tracking module is further configured to detect the re-entry of the primary operator into the detection zone by (i) detecting, within a re-entry time threshold, left and right eye positions of a newly-appearing face in an image, (ii) computing a normalized image of the image, and (iii) comparing the normalized image to one or more stored facial images, and, upon finding a match, detecting the re-entry of the primary operator into the detection zone.

18. The system of claim 15 further comprising a communications channel between multiple instances of the detection and identification module, authentication module and tracking module, allowing transmission of operator presence, location and biometric information between the instances to provide a single, aggregate measure of operator presence or absence.

19. The system of claim 13 wherein the detection and identification module is further configured to identify one or more faces by:

generating a list of candidate faces from the one or more faces;

removing invalid faces from the list of candidate faces based on one or more of a size parameter, a completeness parameter, a matching parameter and a motion parameter, thereby creating a filtered face list;

comparing the filtered face list with a previously generated face list using one or more of a size parameter, a completeness parameter, a matching parameter and a motion parameter; and updating the previously generated face list with face information from the filtered face list.

20. The system of claim 13 wherein the detection and identification module is further configured to select one of the tracked operators as a primary operator by:

removing faces from a frame of one of the one or more images that are not present in a previous frame;

removing faces from the frame of one of the one or more images having been first detected less than a specified time period prior to the frame; and selecting one of the remaining faces as the primary operator.

* * * * *